2,976,324
BISPHENOL SULFIDE

Samuel Wendell Long and Rodney D. Moss, Midland, Mich., assignors to The Dow Chemical Company, Midland, Mich., a corporation of Delaware No Drawing. Filed Nov. 17, 1958, Ser. No. 774,123

8 Claims. (Cl. 260—609)

The present invention is concerned with a method of making substituted bisphenol sulfides and certain new substituted bisphenol sulfides which are readily made by this invention.

The process of the present invention includes contacting a phenol substituted with at least one of the members of the group consisting of halogen, nitro, alkyl, alkoxy, aralkyl, and cycloalkyl, each carbon-containing radical containing up to 8 carbon atoms, inclusive, and having at least one of the ortho- and para-positions unsubstituted; with a member of the group consisting of bis(chloromethyl) sulfide, bis(bromomethyl) sulfide, chlorodimethyl sulfide, and bromodimethyl sulfide. Equivalent amounts of reactants are generally used, although the ratio may be varied somewhat if desired. The reaction may be carried out with or without a Friedel-Crafts catalyst, such as, for example, $AlCl_3$, $ZnCl_2$ $MgCl_2$ and the like. Temperatures from about 0° C. to about 110° C. are generally employed, and the temperature depends on the reactivity of the starting materials. Thus, in the reaction of 6-chloro-o-cresol with bis(chloromethyl) sulfide temperatures of 65° to 75° C. were used. If desired, higher terminal temperatures may be employed to insure completion of the reaction. Atmospheric pressure is desirably used although higher or lower pressures may be employed if desired. A reaction time of from about 1 to about 5 hours is generally sufficient to obtain substantial completion of the reaction. The products may be separated in any convenient manner, such as, for example, distillation, solvent extraction, or other means suitable for the particular bisphenol sulfide.

Phenol starting materials which are suitable include, for example, 2,4-dichlorophenol, o-chlorophenol, o-bromophenol, 6-chloro-o-cresol, o-nitrophenol, o-fluorophenol, 4-chloro-2-cyclohexylphenol, 4-chloro-2-phenylphenol, 4-chloro-2-nitrophenol, 2-chloro-4-ethoxyphenol, 4-methoxy-2-nitrophenol, 2-cyclohexyl-4-nitrophenol, 4-nitro-2-phenylphenol, 6-nitro-o-cresol, o-cresol, p-methoxyphenol, 2-cyclohexylphenol, o-phenolphenol and the like.

Sulfide starting materials which are suitable are chlorodimethyl sulfide, bromodimethyl sulfide, bis(chloromethyl) sulfide, and bis(bromomethyl) sulfide.

The reaction of the present invention may be illustrated by the following equation:

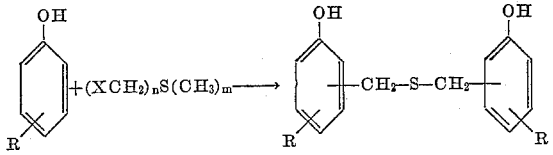

wherein R represents a member of the group consisting of halogens having an atomic weight of from 19 to 80, nitro, alkyl, alkoxy, aralkyl, cycloalkyl, and aryloxy groups, and wherein each carbon-containing radical may contain up to 8 carbon atoms, inclusive; X represents chlorine or bromine; $n$ is an integer from 1 to 2, and $m$ is an integer from 0 to 1, being 1 when $n$ is 1 and 0 when $n$ is 2.

When the phenol starting material is substituted with at least one halogen having a molecular weight of from 19 to 80, i.e., fluorine, chlorine, or bromine; or a nitro group, new compounds are produced, such as, for example, $\alpha^4,\alpha^{4'}$-thiobis(6-chloro-2,4-xylenol); $\alpha,\alpha'$-thiobis(4,6-dichloro-o-cresol); $\alpha,\alpha'$-thiobis(3,4,6-trichloro-o-cresol); $\alpha,\alpha'$-thiobis(4-nitro-6-phenyl-o-cresol); $\alpha,\alpha'$-thiobis(4-chloro-6-nitro-o-cresol); and $\alpha,\alpha'$-thiobis(6-bromo-4-fluoro-o-cresol). These new compounds are liquids or solids somewhat soluble in many organic solvents and of low solubility in water. These new compounds are useful as herbicides, fungicides, insect repellents, antioxidants and in phosphorous fixation and are particularly adapted to be employed as active toxic constituents of compositions for the control of the growth of fungal organisms. In a representative operation, 100 percent control of the fungus, Fusarium oxysporum Lycoper, was obtained upon exposure to $\alpha,\alpha'$-thiobis(3,4,6-trichloro-o-cresol) at a concentration of 10 parts per million of ultimate composition.

The following examples illustrate the invention but are not to be construed as limiting the invention thereto:

*Example I.—Preparation of $\alpha^4,\alpha^{4'}$-thiobis (6-chloro-2,4-xylenol)*

A 1-liter flask was charged with 285 grams (2.0 moles) of 6-chloro-o-cresol, 131 grams (1.0 mole) of bis(chloromethyl) sulfide and 5 grams of anhydrous aluminum chloride. The mixture was stirred 2 hours at 65–75° C., the phenolic products extracted with dilute sodium hydroxide, and reprecipitated with dilute hydrochloric acid. Upon recrystallization from ethylidene dichloride, $\alpha^4,\alpha^{4'}$-thiobis(6-chloro-2,4-xylenol) was obtained as a white crystalline product having a melting point of 156°–159° C.

*Example II.—Preparation of $\alpha,\alpha'$-thiobis (4,6-dichloro-o-cresol)*

A 1-liter flask was charged with 163 grams (1.0 mole) of 2,4-dichlorophenol and 96.5 grams (1.0 mole) of chlorodimethyl sulfide was added during an 80 minute period at 28°–40° C. The mixture was stirred and heated to 100° C. for an additional 3 hours. Distillation at 0.3 millimeter of mercury pressure absolute resulted in the separation of 53.5 grams of 4,6-dichloro-$\alpha$-(methylthio)-o-cresol, boiling at 105–108° C. The distillation residue was recrystallized from tetrachloroethylene and yielded 98 grams of $\alpha,\alpha'$-thiobis(4,6-dichloro-o-cresol), having a melting point of 81–82° C. This represents a yield of 51 percent of the theoretical.

*Analysis.*—Calculated: Cl, 36.7%; S, 7.8%. Found: Cl, 37.0%; S, 8.33%.

*Example III.—Preparation of $\alpha,\alpha'$-thiobis(3,4,6-trichloro-o-cresol)*

A 1-liter flask was charged with 197.5 grams (1.0 mole) of 2,4,5-trichlorophenol, 96.5 grams (1.0 mole) of chlorodimethyl sulfide, 1 gram of magnesium chloride, and stirred and heated at 60°–83° C. for five hours. The more volatile components were removed by distillation and the residue recrystallized to obtain 58 grams of white crystalline $\alpha,\alpha'$-thiobis(3,4,6-trichloro-o-cresol) having a melting point of 151°–158° C.

*Analysis.*—Calculated: Cl, 47.0%. Found: Cl, 47.0%.

In a manner similar to that of the foregoing examples, other substituted bisphenol sulfides may be prepared, such as, for example, $\alpha,\alpha'$-thiobis(4-chloro-6-cyclohexyl-o-cresol), by reacting 4-chloro-6-cyclohexylphenol with bis(bromomethyl) sulfide; $\alpha,\alpha'$-thiobis(4-chloro-6-phenyl-o-cresol), by reacting 4-chloro-6-phenylphenol with bis (chloromethyl) sulfide; α,α'-thiobis(4 chloro-6-nitro-o-cresol) by reacting 4-chloro-2-nitrophenol with chlorodimethyl sulfide; α,α'-thiobis(6-chloro-4-ethoxy-o-cresol), by reacting 2-chloro-4-ethoxyphenol with bromodimethyl sulfide; α,α'-thiobis(4-methoxy-6-nitro-o-cresol), by reacting 4-methoxy-2-nitrophenol with bis(bromoethyl) sulfide; α,α'-thiobis-(6-fluoro-o-cresol) and α,α'-thiobis(2-fluoro-p-cresol), by reacting o-fluorophenol with bis(chloromethyl) sulfide; α,α'-thiobis(6-cyclohexyl-4-nitro-o-cresol), by reacting 2-cyclohexyl-4-nitrophenol with chlorodimethyl sulfide; α,α'-thiobis(4-nitro-6-phenyl-o-cresol), by reacting 4-nitro-2-phenylphenol with bis(bromomethyl) sulfide; α$^4$,α$^{4'}$-thiobis(6-nitro-2,4-xylenol), by reacting 6-nitro-o-cresol with bis(chloromethyl) sulfide; α,α'-thiobis(6-chloro-4-tertiary octyl-o-cresol), by reacting 2-chloro-4-tertiary-octylphenol with chlorodimethyl sulfide; α,α'-thiobis(4,6-dinitro-o-cresol), by reacting 2,4-dinitrophenol with bromodimethyl sulfide; α,α'-thiobis(4,6-difluoro-o-cresol), by reacting 2,4-difluorophenol with bis(bromomethyl) sulfide; α,α'-thiobis(4,6-dibromo-o-cresol), by reacting 2,4-dibromophenol with bis(chloromethyl) sulfide; α,α'-thiobis(6-chloro-4-phenoxy-o-cresol), by reacting 2-chloro-4-phenoxyphenol with chlorodimethyl sulfide; α,α'-thiobis(6-phenoxy-o-cresol) and α,α'-thiobis(2-phenoxy-p-cresol), by reacting o-phenoxyphenol with bromodimethyl sulfide; α,α'-thiobis(4-octyloxy-o-cresol), by reacting p-octyloxyphenol with bis(bromoethyl) sulfide; α,α'-thiobis(6-pentoxy-o-cresol) and α,α'-thiobis(2-pentoxy-p-cresol), by reacting o-pentoxyphenol with bis(chloromethyl) sulfide; α,α'-thiobis(6-tertiarybutyl-o-cresol) and α,α'-thiobis(2-tertiarybutyl-p-cresol), by reacting o-tertiary-butylphenol with chlorodimethyl sulfide; α,α'-thiobis(6-chloro-4-fluoro-o-cresol), by reacting 2-chloro-4-fluorophenol with bromodimethyl sulfide, α,α'-thiobis(4-chloro-6-nitro-o-cresol), by reacting 4-chloro-2-nitrophenol with bis(bromomethyl) sulfide; α,α'-thiobis(6-bromo-4-fluoro-o-cresol), by reacting 2-bromo-4-fluorophenol with bis(chloromethyl) sulfide; α,α'-thiobis(6-bromo-4-nitro-o-cresol), by reacting 2-bromo-4-nitrophenol with chlorodimethyl sulfide; α,α'-thiobis-(4,5-dichloro-o-cresol) and α,α'-thiobis(3,4-dichloro-o-cresol) by reacting 3,4-dichlorophenol with bromodimethyl sulfide and the like.

Thus, the compounds of the present invention are bisphenol sulfides having the formula $(R-C_nH_{2n})_2S$ wherein R represents a halogen or nitro-substituted phenol which may have a lower alkyl, alkoxy, aralkyl, cycloalkyl, or aryloxy group; wherein the carbon-containing radical may contain up to 8 carbon atoms, inclusive; on the benzene ring.

Various modifications may be made in the present invention without departing from the spirit or scope thereof, and it is to be understood that we limit ourselves only as defined in the appended claims.

We claim:
1. The process of preparing bisphenol sulfides which includes: contacting, at a temperature of from about 0° C. to about 110° C. and at a pressure of about atmospheric pressure, 6-chloro-o-cresol with bis(chloromethyl) sulfide; and separating the α$^4$,α$^{4'}$-thiobis(6-chloro-2,4-xylenol) product.

2. The process of preparing bisphenol sulfides which includes: contacting, at a temperature of from about 0° C. to about 110° C. and at a pressure of about atmospheric pressure, 2,4-dichlorophenol with chlorodimethyl sulfide; and, separating the α,α'-thiobis(4,6-dichloro-o-cresol) product.

3. The process of preparing bisphenol sulfides which includes: contacting, at a temperature of from about 0° C. to about 110° C. and at a pressure of about atmospheric pressure, 2,4,5-trichlorophenol with chlorodimethyl sulfide; and, separating the α,α'-thiobis(3,4,6-trichloro-o-cresol) product.

4. α,α'-Thiobis(chlorocresols).
5. α$^4$,α$^{4'}$-Thiobis(6-chloro-2,4-xylenol).
6. α,α'-Thiobis(4,6-dichloro-o-cresol).
7. α,α'-Thiobis(3,4,6-trichloro-o-cresol).
8. A compound having the formula

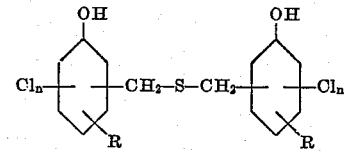

wherein R represents an alkyl group containing from 1 to 3 carbon atoms and n is an integer from 1 to 3 inclusive.

References Cited in the file of this patent
UNITED STATES PATENTS

| | | |
|---|---|---|
| 2,417,118 | McCleary et al. | Mar. 11, 1947 |
| 2,488,134 | Mikiska et al. | Nov. 15, 1949 |